United States Patent [19]

Roth

[11] 4,201,302
[45] May 6, 1980

[54] METHOD AND APPARATUS FOR DIVIDING FAT AND LEAN MEAT

[76] Inventor: Eldon N. Roth, 99 Madera Ct., San Ramon, Calif. 94583

[21] Appl. No.: 949,760

[22] Filed: Oct. 10, 1978

[51] Int. Cl.$^2$ ............................................. B07C 5/342
[52] U.S. Cl. .................................... 209/577; 209/656; 209/922; 99/489; 250/223 R
[58] Field of Search ............... 209/552, 576, 577, 580, 209/581, 587, 606, 656, 922; 250/223 R; 99/489, 537

[56] References Cited

U.S. PATENT DOCUMENTS

| | | | |
|---|---|---|---|
| 2,373,361 | 4/1945 | Walter | 99/489 |
| 2,787,832 | 4/1957 | Conway | 99/489 X |
| 3,049,232 | 8/1962 | Johnston | 209/922 X |
| 3,499,527 | 3/1970 | Badgley | 209/587 X |
| 3,930,991 | 1/1976 | Gillespie | 209/587 X |
| 3,978,987 | 9/1976 | Neville et al. | 209/576 |

*Primary Examiner*—Joseph J. Rolla
*Attorney, Agent, or Firm*—Fitch, Even & Tabin

[57] ABSTRACT

A method and apparatus for dividing meat components such as fat and lean meat wherein the combined fat and lean meat are passed through an extruder sized to form one or more chains of material wherein the fat and lean meat are divided along the length thereof, the character of material along each chain being sensed by a suitable sensor with the fat and lean meat being divided by a diverter functioning in delayed response to the sensor.

19 Claims, 6 Drawing Figures

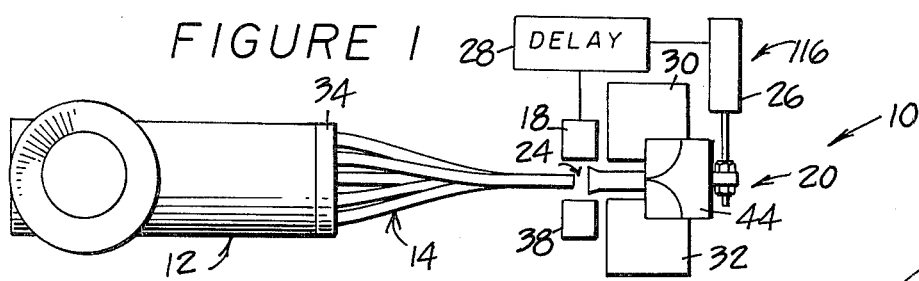
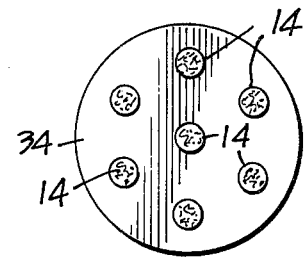
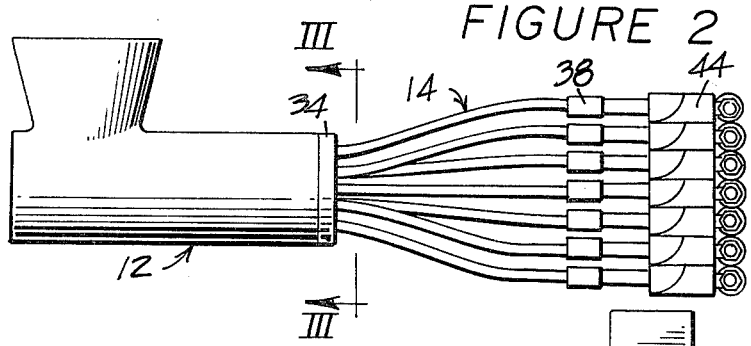
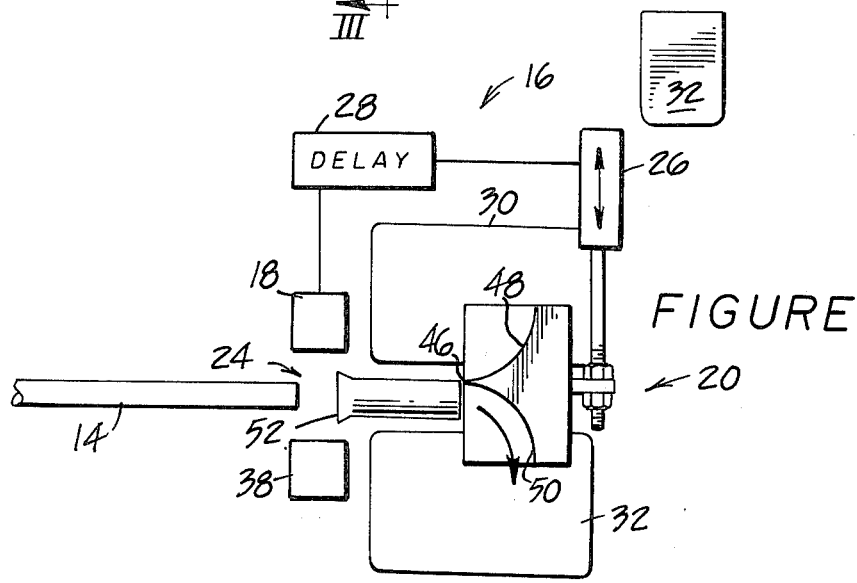
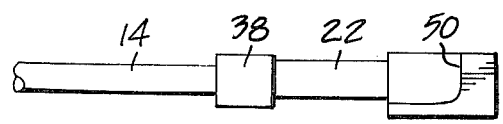
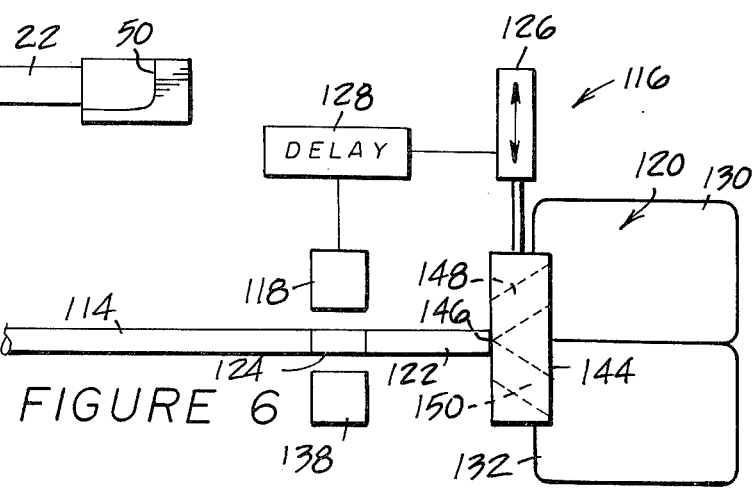

METHOD AND APPARATUS FOR DIVIDING FAT AND LEAN MEAT

The present invention relates to a method and apparatus for dividing meat components such as fat and lean meat and more particularly to such a method and apparatus wherein the fat and lean meat are first extruded to form a generally continuous chain and then divided by means functioning in response to suitable sensor means. In a preferred embodiment of the invention as described below, division of the meat components in each continuous extruded chain is accomplished is delayed response to color sensitive photoelectric means. However, it will be apparent from the following description that other means can also be employed for detecting or sensing the specific identity of material along the extruded chain.

In the prior art, a number of techniques have been disclosed for dividing fat and lean meat wherein optical or color sensitive means are employed to detect the presence of fat or lean meat. For example, Gillespie U.S. Pat. No. 3,930,991, issued Jan. 6, 1976, disclosed a system and method for processing meat wherein a combination of lean and fat meat was first cut into chunks of uniform size and then passed through a photometric sensing means for detecting an optical property relating to the lean meat content of the chunks, the chunks then being sorted by means responsively coupled with the photometric sensing means.

Additional prior art disclosures of similar processing techniques are included for example in Walter U.S. Pat. No. 2,373,361 which also employed photoelectric means for separating fat and lean portions of meat products.

These patents are representative of efforts to eliminate problems associated with manual separation of fat and lean portions of meat products. Manual separation was found to be very slow and expensive with significant portions of lean meat remaining with the lower value fat. In each of the patents, the lean and fat meat were first arbitrarily divided into particles or chunks and then passed through photoelectric or color sensitive means which caused suitable gate or sorting means to separate out those particles or chunks having substantial portions of lean meat therein.

These prior art techniques clearly demonstrate the advantages of separating fat and lean meat by means avoiding the need for direct manual control. However, it has been found that certain disadvantages are still inherent in such techniques. For example, when the combination of fat and lean meat is arbitrarily divided into particles or chunks, even of small size, only a very small portion of the particles or chunks are entirely formed from the material initially present in smaller quantities, in this instance, the lean meat. Accordingly, it is only possible thereafter to separate particles or chunks having a certain percentage of lean meat. Practically speaking, it may be necessary to separate particles including only 25–50% of lean meat for example in order to recover a significant portion of the lean meat originally available. Thus, with the remaining portion of each particle or chunk being fat, a substantial percentage of fat is separated along with the lean meat.

In addition, substantial processing is required in such technique to condition the individual particles or chunks for passage through the photoelectric sensor means. For example, the second noted reference above depends upon the grinding of the combined fat and lean meat into coarse particles which are then flattened onto a belt, suitable texture of the particles being necessary to cause their adhesion to the belt. In the first noted reference, the individual chunks are preferably maintained at a low temperature close to freezing in order to permit singularizing the chunks for passage through the photometric sensing means. Such requirements significantly reduce the rate of separation in addition to increasing operating costs for the process.

Accordingly, there has been found to remain a need for a method and apparatus for rapidly and efficiently separating meat components such as fat and lean meat. It will be apparent from the following description that such a method and apparatus may also be employed for example to remove bone particles from meat or to remove foreign objects such as metals from meat products.

SUMMARY OF THE INVENTION

It is therefore an object of the present invention to provide an improved method and apparatus for separating various components from meat products wherein the meat product is first extruded to form a plurality of chains of the product having the various components along the length of each chain, individual chains being passed through suitable sensor means and diverter means functioning in response to the sensor for dividing or diverting selected components or portions of the chain. Preferably, the diverting means is spaced apart from the sensor and functions in delayed response thereto. Generally, the invention is particularly contemplated for separating different components of the meat product itself such as separating fat from lean meat and/or separating bone from either fat or lean meat or a combination of the two. In addition, the invention may also be employed to separate foreign material such as metals or the like from the meat products.

It is a further object of the invention to provide such an improved method and apparatus for specifically separating fat and lean meat.

An even further object of the invention is to provide a method and apparatus wherein the diverting means is spaced apart from the sensor and functions in delayed response thereto, electronic circuitry or the like being employed to accomplish the delayed response, the delayed response even more preferably being made variable in order to permit adjustment of the degree of separation between certain meat components. For example, where the apparatus and method of the invention are being employed for separating fat and lean meat, a variable or adjustable delay may be employed for more accurately establishing the degree of separation between the fat and lean meat or for adjusting the amount of fat to be diverted along with the lean meat.

It is a more specific object of the invention to provide such a method and apparatus wherein the character of material within the chain is determined by color sensitive means.

It is yet another specific object of the invention to provide a method and apparatus wherein the cross-sectional size of the individual chains of extruded meat are selected to facilitate and increase effective separation or aggregation of fat and lean meat along the length of the chains.

Yet another specific object of the invention is to provide a method and apparatus wherein the combination of fat and lean meat is extruded by grinder apparatus equipped with an extruder plate having a number of similarly sized openings, hollow conduits being provided for receiving extruded material from each of the plate openings to conduct the individual chains of meat through the sensor means and diverter means.

Additional objects and advantages of the present invention will be made apparent in the following description having reference to the accompanying drawing.

BRIEF DESCRIPTION OF THE DRAWING

FIG. 1 is a generally schematic plan view of apparatus constructed according to the present invention for separating fat from lean meat.

FIG. 2 is a side elevation view of the apparatus of FIG. 1.

FIG. 3 is a view taken along section line III—III of FIG. 2.

FIG. 4 is an enlarged fragmentary plan view, which is generally schematic, illustrating one of a plurality of sensing and diverting subassemblies from the apparatus of FIGS. 1 and 2.

FIG. 5 is a side view in elevation of the apparatus of FIG. 4.

FIG. 6 is a view generally similar to FIG. 4 while illustrating an alternate embodiment of the invention.

DESCRIPTION OF THE PREFERRED EMBODIMENTS

As noted above, the present invention relates to a method and apparatus for separating various components of meat products. In this connection the invention may be employed for example to divide fat and lean meat or for dividing bone from either fat or lean meat or a combination thereof. In addition, the invention may also be employed to remove foreign material such as metal or the like from such meat products. Accordingly, within the context of the present invention, any such foreign material is also to be considered a component of the meat product.

Referring now to the drawings and especially to FIGS. 1 and 2, the present invention particularly contemplates processing of animal fat including in part some lean meat which is desirably to be removed from the fat. For example, the animal fat may be obtained as trimmings during the butchering of animal carcasses. Generally, the trimmings comprise animal fat in large part with a small portion, possibly 5-10% or even less, of lean meat. However, it is commonly desirable or necessary in order to remove the lean meat from the fat. Initially, the value of the lean meat is substantially greater that the fat so that separation of the fat and lean meat is commonly accomplished for purposes of economy. Accordingly, the apparatus described immediately below is constructed in accordance with the present invention and is also operable in accordance with the invention for preferably separating fat from meat.

Referring to FIGS. 3-5 as well as FIGS. 1 and 2, processing apparatus for separating fat from lean meat is generally indicated at 10. The apparatus includes extruding means 12 for dividing the combination of fat and lean meat into a plurality of generally endless chains respectively contained within the tubes 14.

According to the present invention, the continuous chain of material passing through the respective tubes is separated by similar apparatus. The separation apparatus operating in combination with one of the tubes 14 is generally indicated at 16 and includes sensor means 18 for detecting the presence of fat or lean meat along the chain of material passing through the respective tube 14. A diverting mechanism 20 is spaced apart from the location of the sensor means 18 by an additional length of tubing indicated at 22.

A gap 24 is provided between each of the tubes 14 and tube extension 22 to permit direct interaction between the sensor means 18 and the material passing through the tube.

The diverting mechanism 20 is operated by suitable means such as the double-acting solenoid 26. Suitable electronic circuitry indicated at 28 operates the solenoid in delayed response to the sensor so that the position of the diverting mechanism is adjusted by the sensor means after a time interval required for material to pass from the gap 24 through the tube extension 22.

The diverting mechanism is arranged to direct material from the tube extension 22 into either of a pair of collection bins or means 30 and 32.

The basic components for the invention as summarized above are described in greater detail below.

The extruding means or grinder 12 is of a type including a rotating auger for separating the material introduced into the grinder and forcing it through a replaceable die plate 34 forming a plurality of openings. The tubes 14 are integrally connected with the die plate 34 for respective communication with the openings formed therein.

A grinder of this type has been found to increase the degree of separation of lean meat from the fat, particularly when the combination of fat and lean meat is extruded through the openings in the die plate 34. For this purpose, the openings have a preferred maximum size of about one-half inch (1.25 centimeters) and more preferably a size range of about one-eighth to one-quarter inch (0.3 to 0.6 centimeters) if substantial separation is desired.

The die openings may be even larger than the half-inch size noted above for some applications, for example where accurate separation between fat and lean meat is not necessary. In some instances, it is only desired to upgrade the percentage of lean meat for example from possibly 10% to 20%. In that event, very large or course openings could be provided in the grinder or extruder to permit removal of only a portion of the fat necessary to raise the lean meat percentage to approximately 20%.

The tubes 14 are preferably shaped to form one or more banks as is best illustrated in FIGS. 1 and 2. The arrangement of the tubes in banks facilitates arrangement of the various sensor means 18 for monitoring material passing through the respective gaps 24. A source of light 38 adjacent the gap 24 is associated with each photoelectric sensing unit 18. The photoelectric sensing unit 18 is coupled with the respective electronic circuit 28 which is of generally conventional construction for providing a delayed actuating signal to the double-acting solenoid 26. The solenoid in turn is coupled with the diverting mechanism 20 which is thus operated according to the present invention for directing fat into the one collection bin 30 while lean meat is directed into the other collection bin 32.

For this purpose, the diverting mechanism 20 comprises a shuttle block 44 positioned by the double-acting solenoid and including a diverter edge 46 and shaped guide surfaces 48 and 50. As the shuttle block moves from one extreme position to the other, the diverter edge 46 passes in one direction or the other by the opening of the tube extension 22. In this way, the diverter edge 46 and one of the guide surfaces 48 and 50 serve to direct fat toward the one collection bin 30 and lean meat toward the other collection bin 32. The actuating delay provided by the circuit means 28 synchronizes movement of the shuttle blocks 44 under the influence of the solenoid 26. Thus, when the sensor 18 provides a signal to the delay circuit indicating the presence of fat or lean meat, the shuttle block 44 is shifted by a delayed time period corresponding to the interval of time required for the material to pass through the remaining tube extension 22.

In operation, a combination of fat and lean meat is introduced into the grinder 12 and is extruded through the die plate 34 and the tubes 14. As the material from each tube 14 passes across the corresponding gap 24, the photoelectric sensor 18 for each tube detects the presence of fat or lean meat. A corresponding signal including a suitable delay is transmitted by the circuit 28 to the double-acting solenoid 26. Thus, the material monitored at any instant by the sensing unit 18 passes into the flared end 52 of the tube extension toward the diverting mechanism 20. The shuttle block 44 of the diverting mechanism is accordingly positioned in accordance with the time required for passage of material from the gap 24 through the tube extension so that fat is substantially directed toward one collection bin with lean meat being substantially directed toward the other collection bin.

In this manner, the present invention permits a substantially increased degree of separation between the fat and lean meat. This is made possible since the processing apparatus of the present invention does not cut the combination of fat and lean meat into random particles or chunks. Rather, the continuous chains of material passing through the tubes are diverted only when there is a detectable change between fat and lean meat. Thus, the material diverted toward either of the collection bins tends to be either entirely fat or entirely lean meat.

Generally, as described above, each continuous chain of meat product will be formed with interfaces of fat and lean meat along its length. With a delay function as described above, the shuttle will be adjusted to cut through the chain in fixed relation to each interface. In processing a meat product where the interfaces are very accurately defined, this might result in the shuttle breaking the chain at a fixed distance behind each interface. Thus, a certain amount of fat might be left with each diverted portion of lean meat or a certain amount of lean meat might be left with each diverted portion of fat. According to the present invention, the circuit means 28 or the solenoid component 26 might be adjusted to vary the length of delay. For example, the circuitry or solenoid could be adjusted to shift the shuttle 44 more rapidly in one direction than the other. In this manner, if the sensor 18 were sensing a length of fat followed by a length of lean meat along one of the continuous chains, the shuttle might be shifted somewhat more rapidly in order to cut through the chain just ahead of the fat-lean meat interface to insure removal of the entire lean meat component. On the other hand, as the sensor subsequently detects a length of lean meat followed by a length of fat, shifting of the shuttle 44 in the opposite direction might be accomplished somewhat more slowly in order to cut through the chain after the interface, thereby again assuring complete removal of the lean meat. In this manner, the shuttle 44 could be operated in some applications to assure substantially complete removal of one component.

Another embodiment of the diverting mechanism for the present invention is illustrated in FIG. 6 at 120. Components of the diverting mechanism 120 of FIG. 6 which are similar to components of FIG. 4 are indicated by the same numerical labels preceded by the additional "1".

The embodiment of FIG. 6 differs primarily in the construction of the diverting mechanism itself and the provision of a solid enclosure between each tube 114 and tube extension 122. Preferably, a transparent tube segment, formed from glass or plastic for example and indicated at 124, is interconnected between each tube 114 and the tube extension 122 in place of the gap 24 described above in connection with the embodiment of FIGS. 1-5.

As for the diverting mechanism 120, it also includes a shuttle 144 which internally forms a diverter edge 146 with guide passages 148 and 150 formed internally by the shuttle block on opposite sides of the diverter edge. The guide passages 148 and 150 extend outwardly from each other to facilitate direction of fat and lean meat toward the appropriate one of the collection bins 130 and 132.

The embodiment of FIG. 6 has a particular advantage of facilitating operation because material from the extruder or grinder 12 remains in an enclosed passage up to the point where it passes from the shuttle block 144. Otherwise, operation of the processing apparatus of FIG. 6 takes place in substantially the same manner described above in connection with the embodiment of FIGS. 1-5.

Each of the embodiments of the present invention and the method of the invention practiced in accordance therewith permits a substantially increased degree of separation between fat and lean meat. In each of the embodiments, this increased degree of separation is accomplished by diverting the fat and lean meat into appropriate collection means only when there is a difference in the material passing a detector. Thus, the present invention avoids the need for random separation of the combined fat and lean meat into particles or chunks containing unknown percentages of both fat and lean meat.

In addition, the invention provides a number of other advantages over the prior art. For example, the processing apparatus does not require a processing path along which predivided particles or chunks must be passed for detection of fat or lean meat. Rather, individual sensors and diverters responsive thereto are provided for processing continuous chains of material from each of a series of extrusion openings. Thus, much more effective separation or diversion of fat and lean meat may be accomplished at a much higher processing rate. Since there is no need to initially form individual particles in order to accomplish separation of fat from lean meat, the processing apparatus and method of the present invention also permits separation of fat from lean meat over a wide temperature range. The apparatus embodying the invention is also particularly simple and sanitary.

Many variations and modifications are possible for the method and apparatus described above within the scope of the present invention. For example, the tubes 14 could be integrally connected to an adapter plate having similar openings as the die plate. In this manner, the adapter plate could be mounted upon the grinder 12 along with the die plate to facilitate interconnection of the tubes 14 with the openings in the die plate. In addition, the entire length of the tubes 14 or the tubes 114 as illustrated in FIG. 6 could be formed from a material transparent to the sensor 118. Thus, the term transparent is being used herein only in connection with the sensor 18 or 118 and is not necessarily limited to visual transparency.

The control circuitry indicated at 28 and 128 was described above as preferably including delay means for adjusting movement of the shuttle 44 or 144 in order to assure complete removal of lean meat from fat. It will be apparent that by proper adjustment of the delay, the amount of fat to be removed with the lean meat could be closely adjusted. For example, the delay setting for the control circuitry could be adjusted to divert either 25% or 50% fat with lean meat. Other proportions would also be possible.

The control circuitry 28 or 128 could further be adapted to include computer means for even more accurately regulating the percentage of fat diverted with the lean meat. In some applications, the simple delay function described above might be inaccurate if a segment of lean meat along one of the continuous chains of material were followed by a small amount of fat and then another segment of lean meat. This might normally prevent diverting of the preferred percentage of fat along with both segments of lean meat if a simple delay circuit were employed. However, the computer means referred to above could readily calculate the amount of fat to be further diverted in order to adjust the overall percentage of fat diverted along with the lean meat.

It was also noted above that the sensing and diverting combination of the present invention could also be employed for removing foreign materials such as metals from a meat product. Thus, it would be possible to employ two such sensing and diverting combinations in series. For example, the combinations of FIGS. 4 and 6 could be employed in series, the first combination removing foreign material from the meat product, the second combination functioning generally in the manner described above. Finally, it will also be apparent that the method and apparatus of the present invention could also be employed for separating components of other food products where the various components were characterized by different color or other characteristics capable of detection by a sensor such as that indicated above at 18 or 118.

Accordingly, the scope of the invention is defined only by the following appended claims.

What is claimed is:

1. Apparatus for separating selected components of meat products, comprising
   means for extruding a combination of the components into a plurality of generally continuous chains of material,
   separation aparatus for dividing the components in each of said chains including
   means for sensing the presence of the selected components along the length of each chain, and
   means responsively coupled with said sensing means for diverting the respective components toward separate collection means.

2. The apparatus of claim 1 further comprising tubular means for receiving each separate continuous chain of material and conducting it past said sensing means and toward said diverting means.

3. The apparatus of claim 1 wherein the meat product comprises a combination of fat and lean meat forming the components to be divided along the length of each chain.

4. The apparatus of claim 3 wherein the sensing means is located at an intermediate portion of said continuous chain and further comprising means for operating said diverting means in response to said sensing means, said operating means including means establishing a delay corresponding to the time required for travel of material in the continuous chain from said sensing means to said diverting means.

5. The apparatus of claim 4 further comprising tubular means for receiving each separate continuous chain of material and conducting it past said sensing means and toward said diverting means.

6. The apparatus of claim 1 wherein the sensing means is located at an intermediate portion of said continuous chain and further comprising means for operating said diverting means in response to said sensing means, said operating means including means establishing a delay corresponding to the time required for travel of material in the continuous chain from said sensing means to said diverting means.

7. The apparatus of claim 6 wherein said delay establishing means are adjustable to selectively vary the percentage of one component being diverted along with the other component.

8. The apparatus of claim 7 being operable to separate fat and lean meat, said one component being fat and said other component being lean meat.

9. The apparatus of claim 2 further comprising tubular means for receiving each separate continuous chain of material and conducting it past said sensing means and toward said diverting means.

10. The apparatus of claim 9 wherein a gap is formed by said tubular means adjacent said sensing means.

11. The apparatus of claim 9 wherein each of said tubular means includes a transparent portion adjacent said sensing means.

12. The apparatus of claim 9 wherein said diverting means comprises a shuttle arranged for reciprocation adjacent the end of each tubular means, said shuttle including a divering edge and guide surfaces, said shuttle being positioned by double-acting actuator means in delayed response to said sensing means in order to respectively divert fat and lean meat from each continuous chain of material toward said respective collection means.

13. The apparatus of claim 9 wherein said extruding means comprises a grinder equipped with a guide plate forming a plurality of extrusion openings through which the combination of fat and lean meat is forced, each of said tubular means being connected with said guide plates for communication with a respective extrusion opening.

14. The apparatus of claim 13 wherein each of the extrusion openings is selected to have a maximum size of approximately one-half inch.

15. The apparatus of claim 14 wherein each said extrusion opening is selected to have a size within a range of approximately one-eighth to one-quarter inch.

16. In a method for separating selected components of meat products, the steps comprising
    extruding the meat product to form a plurality of generally continuous chains of material,
    sensing the presence of the selected components along the length of each chain, and
    diverting the respective components from each continuous chain toward separate collection means, the step of diverting said respective components being dependent upon the step of sensing the presence of those components along the length of each respective chain.

17. The method of claim 16 further comprising the step of receiving each continuous chain of extruded material in a tubular means and conducting said chain past means for sensing the presence of said selected components and toward means for diverting said selected components respectively toward separate collection means.

18. The method of claim 17 wherein each said sensing means is located intermediate respective means for extruding said continuous chain of material and said diverting means and further comprising the step of operating said diverting means is delayed response to said sensing means, the delay corresponding to the time required for travel of material in each continuous chain from said sensing means to said diverting means.

19. The method of claim 16 wherein said product is selected to include fat and lean meat forming the components to be separated.

* * * * *